United States Patent [19]
Siegel et al.

[11] 4,131,941
[45] Dec. 26, 1978

[54] LINKED MICROPROGRAMMED PLURAL PROCESSOR SYSTEM

[75] Inventors: Harvey L. Siegel; Gerald F. Muething, Jr., both of Pleasanton; Edward J. Radkowski, Palo Alto, all of Calif.

[73] Assignee: Itek Corporation, Lexington, Mass.

[21] Appl. No.: 823,360

[22] Filed: Aug. 10, 1977

[51] Int. Cl.$^2$ .................... G06F 15/16; G06F 9/16
[52] U.S. Cl. .................................................. 364/200
[58] Field of Search ........................................ 364/200

[56] References Cited

U.S. PATENT DOCUMENTS

| | | | |
|---|---|---|---|
| 3,560,934 | 2/1971 | Ernst | 364/200 |
| 3,631,405 | 12/1971 | Hoff | 364/200 |
| 3,760,365 | 9/1973 | Kurtzberg | 364/200 |
| 3,916,383 | 10/1975 | Malcolm | 364/200 |
| 3,997,895 | 12/1976 | Cassonnet | 364/200 |
| 4,042,914 | 8/1977 | Curley | 364/200 |

*Primary Examiner*—James D. Thomas
*Attorney, Agent, or Firm*—Homer O. Blair; Robert L. Nathans

[57] ABSTRACT

A network of two or more microprogrammed digital processors is provided which permits operation of the individual processors independently or as linked processors for transferring real time control information at the micro level to establish microprogram control which is supplied from the processor that is processing the data determining the control sequence, resulting in dynamic master/slave relationships, with high performance, by eliminating the need to transfer data used to influence microprogramming sequencing. Next control memory address source designators within each processor, selectively enable microprogram control memory data sources of either processor when the control memory address busses of each processor are linked together. Upon unlinking of the address busses, each next control memory address source designator selectively enables a source only within its own processor, such as a branch address latch source, operation code mapping memory source, and a microsequencer source. Permanently linked processors provide a single processor network for achieving increased performance for multiple precision computations.

24 Claims, 8 Drawing Figures

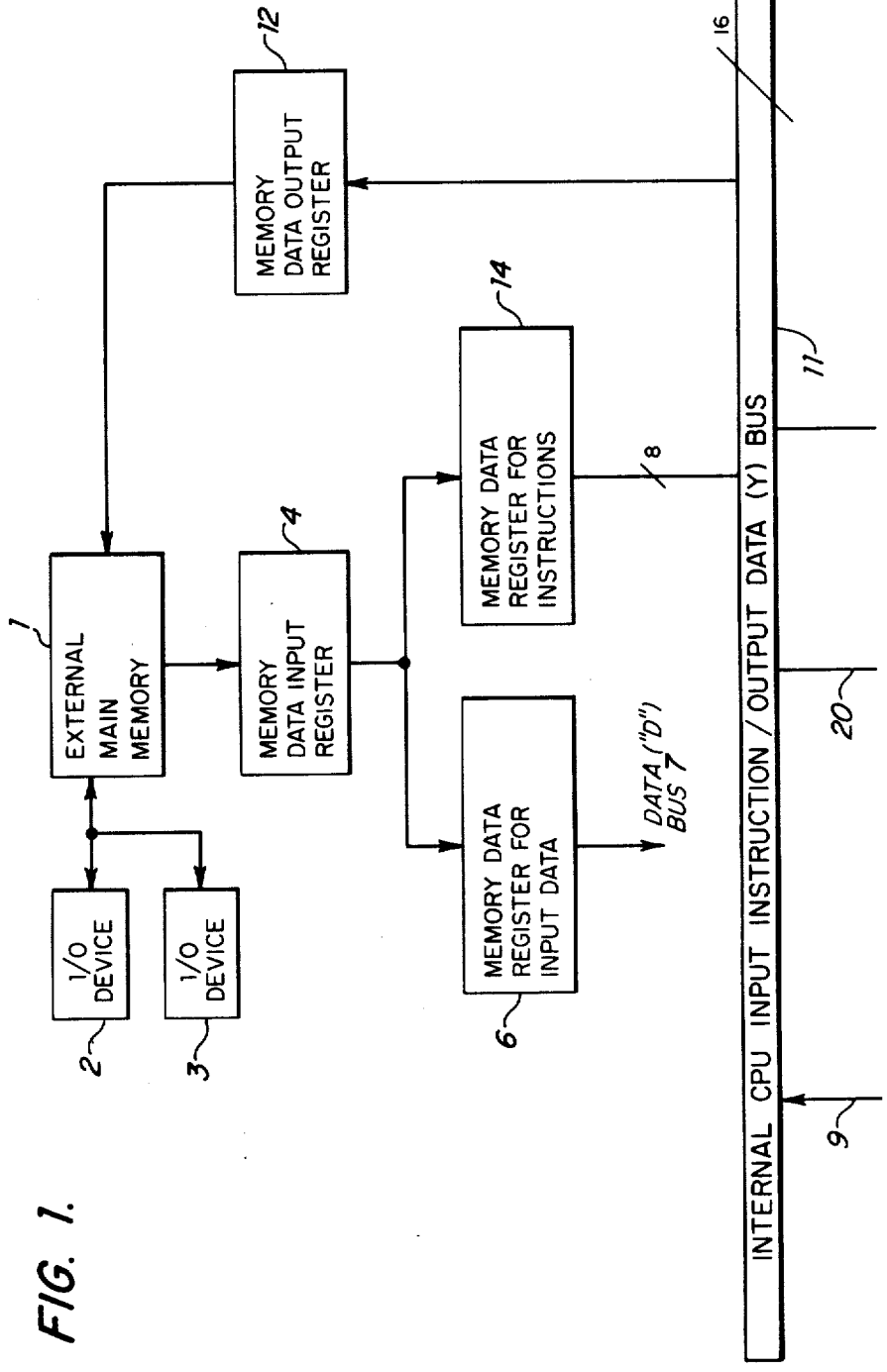

LINKED MICROPROGRAMMED PLURAL PROCESSOR SYSTEM

BACKGROUND OF THE INVENTION

This invention relates to the field of microprogrammable digital processing systems.

As is well understood, central processing units (CPU) generally comprise an arithmetic section (ALU), a general register file, a control section, and a memory interface section. The CPU communicates with an external main memory and input/output circuits. The CPU control section retrieves instructions from the main memory and decodes then to establish the operations required and sequentially generates signals which define the data paths within the computer between the arithmetic unit, the main memory and various internal storage elements within the computer. The routing of data between the main memory machine registers and output circuitry is also carried out by such control section. Generally, specified portions of a microprogram control memory are addressed by an operation code mapping memory and subportions thereof are sequentially addressed by a microprogram sequencer source to produce sequential output instructions. A branch address source also controls the microprogram control memory to address it in a manner to cause it to jump where required to a new section therein, from where sequential operation may continue. These systems are currently familiar to those skilled in the art and a more detailed description of them may be found in U.S. Pat. No. 3,953,833 to Shapiro, dated Apr. 27, 1976 and incorporated by reference herein. For further details, reference may also be made to U.S. Pat. Nos. 3,859,636, and 3,800,293, also incorporated by reference herein. For descriptions of microprogrammed digital processors, their components and modes of operation, developed by the assignee of the present invention, see the following publications also incorporated by reference herein: "Designing the Maximum Performance into Bit-Sliced Mini Computers" by Gerald F. Muething, Jr. at page 91 through 96 of "Electronics" Magazine of September 30, 1976; a paper entitled "The Bit Sliced Bi-Polar Microprocessor..." written by Gerald F. Muething, Jr. and Harvey L. Siegel and presented at National Aerospace and Electronics Conference on May 19, 1977, at Dayton, Ohio.

The interconnection of a plurality of microprocessors to achieve higher performance than that which is available with a single processor is deemed highly desirable. In the past, processor intercommunication at the macro level has been accomplished with respect to data exchanged primarily through shared memory or shared input/output devices. It is deemed highly desirable to provide a network of two or more microprogrammed digital processors which eliminate the need for pre-specification of masters or slaves in linked processor networks, so that the master/slave relationship can be dynamically varied, in order to match processor resources to the data processing load. It is a further object of the invention to establish redundant processor configurations which reduce redundancy overhead and improve system availability and reliability. It is further desirable to provide processor network configurations which readily permit external observation and simulation of the control sections of the processors which is useful in testing such processors.

SUMMARY OF THE INVENTION

In accordance with certain embodiments of the present invention, networks of a plurality of linked microprogrammed digital processors are provided, which permit operation of the individual processors independently or as linked processors for transferring real time control information at the micro level to establish microprogram control which is supplied from the processor that is processing the data determining the control sequence. The resulting dynamic master/slave relationship within the multiple processor network permits high performance by eliminating the need to transfer data information to influence microprogram sequencing. For example, the 16-bit left-hand microprocessor may at times have its bi-directional control memory address bus be decoupled from the corresponding address bus of the right-hand 16-bit processor so that both may simultaneously solve 16-bit problems. At other times it is most efficient to solve a 32-bit problem by selectively linking the microprogram control memory address busses of each processor together so that the resulting multiple processor network may solve the 32-bit problem in the shortest possible time. If a 32-bit problem is solved by a 16-bit processor, the problem execution time would be considerably extended in contrast with the linked 32-bit processor configuration. On the other hand, a 32-bit processor solves a 16-bit problem as fast as a 16-bit processor but wastes its hardware resources during the execution of the 16-bit problem. Thus, by providing a network which carries out the exchange of microprogram control memory source data between processors, dynamic matching of processor resources to the data processing load results, with the minimization of processing time and memory to maintain the size, cost and problem execution time of these processors at a minimum. Power requirements, weight and reliability are also minimized. These factors often become extremely critical in the marketplace. Additionally, three processors may be linked where only two processors are required, to increase reliability through redundancy. The resulting reliability is greater than switching in two stand-by processors for the original two, upon malfunction, and cost is reduced.

In accordance with certain embodiments of the present invention, three-state microprogram control memory address busses of a plurality of processors are selectively coupled together, at least part of the time, to provide for the exchange of microprogram control memory control data between processors, while the next control memory address source designators determine the control sequence by selectively enabling particular sources in selected microprocessors. In this manner, microprogram control may be supplied from the particular processor which is processing the data determining the control sequence, and the resulting dynamic master/slave relationship permits high performance by eliminating the need to transfer data information used to influence microprogram sequencing. In one embodiment of the invention, the next address source designator of a processor may only control the branch address source, operation code map source, and microprogram sequencer source of its associated processor. Each processor can thus enable these sources for itself and a second linked processor, but cannot control itself from the sources of the other processor. In another embodiment of the invention, each next address source designator of each linked processor may utilize the sources of the other linked processor for its own operations. In other words, each processor controls its own sources or the sources of the second linked processor, any of which may at times control its own microprogram control memory. In an additional embodiment of the invention, the microprogram memory address busses of each processor may be permanently linked and the sources of the left-hand processor may control the microprogram control memory of both processors, to produce a single processor of multiple precision. This configuration is capable of utilizing the extended word length of a string of processors, to achieve increased performance for higher precision computations. For example, linking four 16-bit processors together in this mode would solve a 64-bit problem in a minimum of time.

The novel combination of the linked microprogram control memory address busses at the micro level together with the use of the next address source designators, enable microprogram sequencing information to be exchanged between the processors of the multiprocessor network, to efficiently attain the above-mentioned objects of the present invention.

Other objects, features, advantages of the present invention will become apparent upon study of the following detailed description taken in conjunction with the drawings in which:

FIG. 1 discloses the manner in which FIGS. 2–7 are to be arranged while following the description and FIG. 8 discloses another embodiment of the invention.

DETAILED DESCRIPTION

Figure 3:
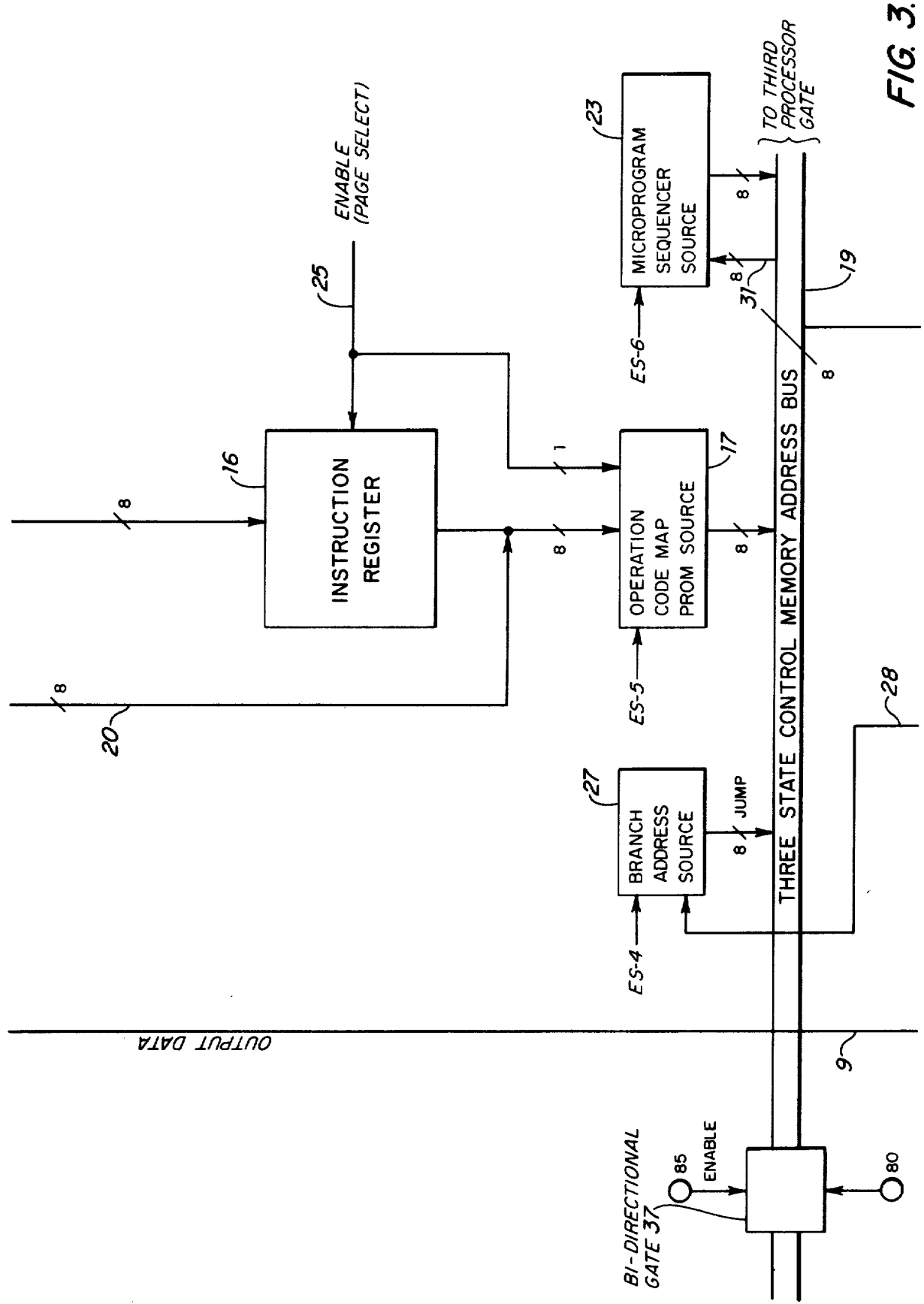

FIG. 2 discloses the external main memory 1 which communicates with input/output devices 2 and 3. Main memory 1 transmits data to memory data input register 4 which in turn communicates with memory data register for input data 6, (generally comprising arithmetic data or effective address index pointers) which in turn transmits variable information data over data bus 7 to a CPU arithmetic logic unit 8, generally referred to as the ALU. After the requisite operations are performed on the input data applied by the data bus to ALU 8, the output data is transmitted over output data bus 9 to the "Y" bus 11, which in turn forwards such data back to the external memory 1 via memory data output register 12. Details of the abovementioned structure are well-known by those skilled in the art and in the interest of clarity, economy and brevity are not described in detail herein.

A second function of the Y bus involves transmitting instruction data from memory data register for instructions 14 to either the instruction register 16 or directly to the operation code mapping read only memory source 17, hereinafter designated as the OCMM source. The function of the OCMM source is to address portions of the microprogram control memory 18 via three-state control memory address bus 19. A particular instruction transmitted to the OCMM source will require access to a particular portion within microprogram control memory 18, which portion contains a plurality of micro instructions which are sequentially read out of the microprogram control memory 18, and which are sequentially applied to ALU 8, other machine registers, and the next control memory address source designator 24 hereinafter designated as the NASD. The particular addressed portion of the microprogram control memory 18 is sequenced, that is sequentially addressed, by microprogram sequencer source 23, which produces the abovementioned sequential control data which is applied to pipeline register 24 which in turn transmits such control data to ALU 8 via lead 5, NASD 24 via lead 21, and other machine registers, e.g. instruction register 16. In other words the addressing of the microprogram control memory 18 may be visualized as positioning an address "pointer" at a particular portion within the memory 18 under the control of OCMM 17, and the subsequent stepping of the "pointer" on a line by line basis is effected by the step by step actuation of sequencer source 23. At various times the data produced by memory 18 and applied to branch address source 27 via microprogram jump address bus 28 will load branch address source 27. Depending upon the data applied by ALU 8 to NASD 24, and/or other conditional inputs, the branch address source 27 may become fully enabled by output lead ES-4 of NASD 24. Should this occur, the address pointer in control memory 18 will be jumped or displaced to a different portion thereof, and such different portion will thereafter be sequentially addressed under the control of microprogram sequencer source 23. The microprogram sequencer source 23 is controlled by source 17 via lead 31, to permit microprogram address incrementing or subroutine entry/exit. These sequencing functions include incrementing through straight-line microcode; micro-subroutine call (push); micro-subroutine return (pop) and micro-code branch (including conditional multiway). In other words, these systems at times cause a jump to a given subroutine in the "stack", execute such subroutine and then cause a return to the former mapping position of memory 18 stored in the microprogram sequencer 23. The abovedescribed microprogram control functions are well-known to those skilled in the art of microprogrammed computers, and thus further detail has been omitted in the interest of clarity, brevity and economy. Reference may be made to the aforesaid patents and publications for further descriptive material.

In accordance with certain embodiments of the invention, the NASD selectively enables one of a number of sources such as 17, 23, and 27 depending upon the data applied to NASD 24, via lead 21, conditional inputs by ALU 8 and/or other external conditional inputs such as, for example a control panel request for "interrupt". NASD 24 may comprise numerous forms of logic circuits including matrices or other dictionaries. In systems constructed by the assignee of the present invention, NASD 24 was a field programmable logic array. The pipeline register 24 functions as a conduit for the 72 bit words sequentially generated by microprogram control memory 18.

It is greatly preferred that the microprogram control memory address bus 19 comprise a three-state bus which is fully described in the following publication: "Tri-state Logic in Modular Systems" RIL 1971, published by National Semiconductor Corp., 2900 Semiconductor Drive, Santa Clara, Calif., 95051, by Don Fleming. The consequence of employing such a three-state control memory address bus is that only one of sources 17, 23 or 27 may be effectively coupled to the microprogram control memory 18 via the three-state bus 19. Coupling of OCMM 17 is effected by the production of an enabling signal upon the fifth enable source lead ES-5 of NASD 24, which enabling signal is only present upon one of the six enable source leads shown at the right-hand portion of NASD 24. Source 27 is coupled to the bus by enabling ES-4 while source 23 is coupled by enabling ES-6. As mentioned above, the selective activation of one of these leads is a function of the inputs applied to NASD 24 by the leads shown at the lower portion thereof.

Figure 4:
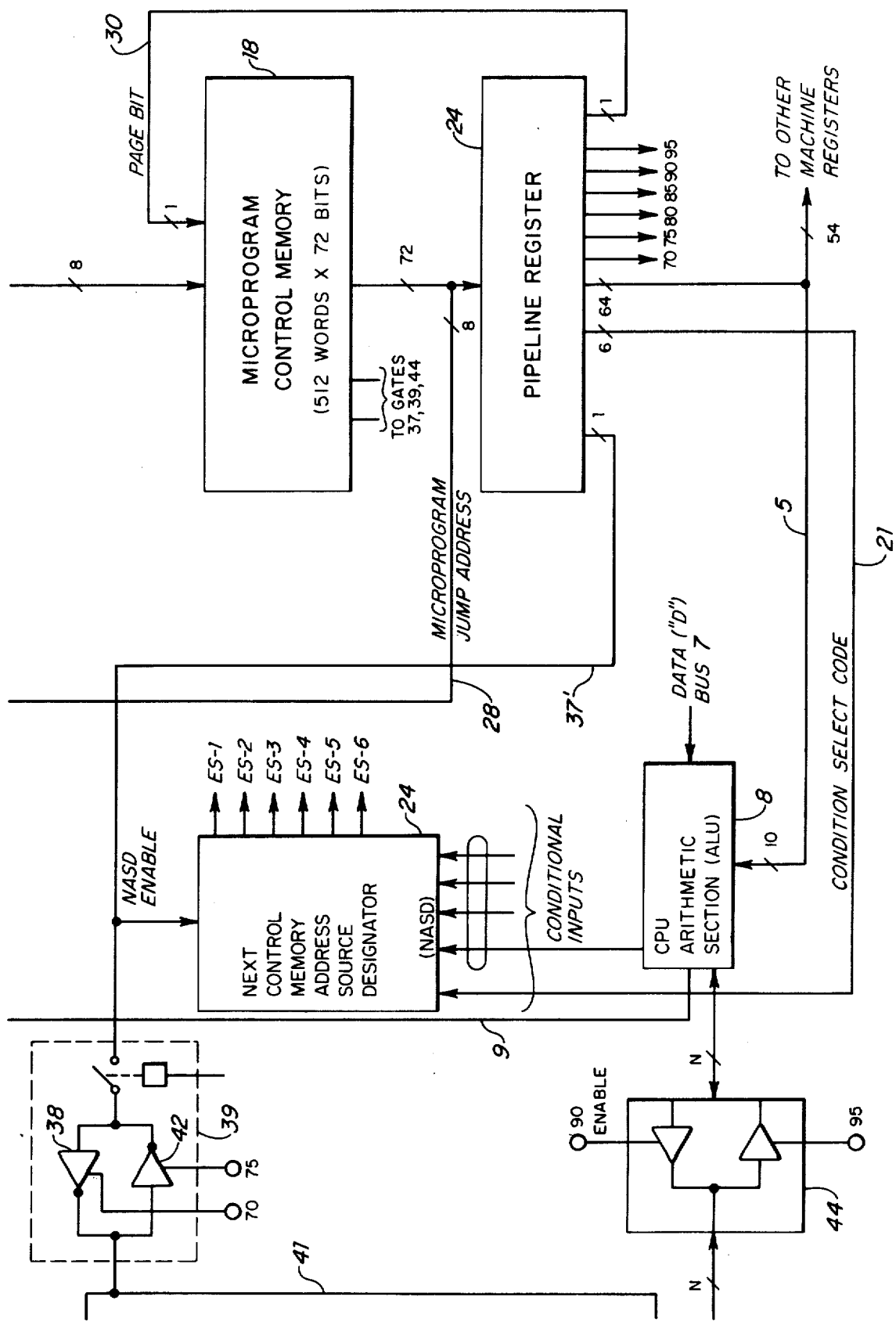
Figure 5:
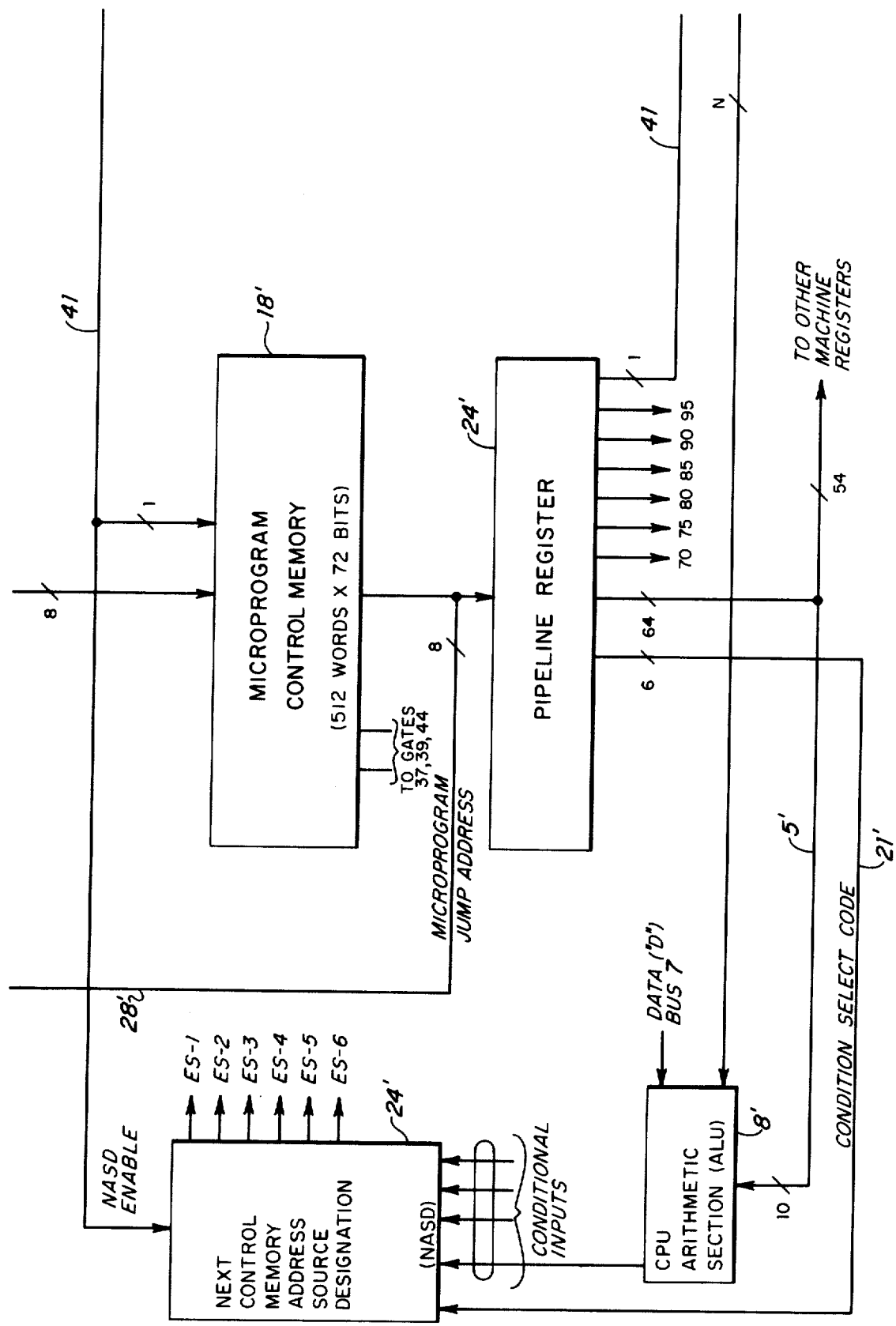
Figure 6:
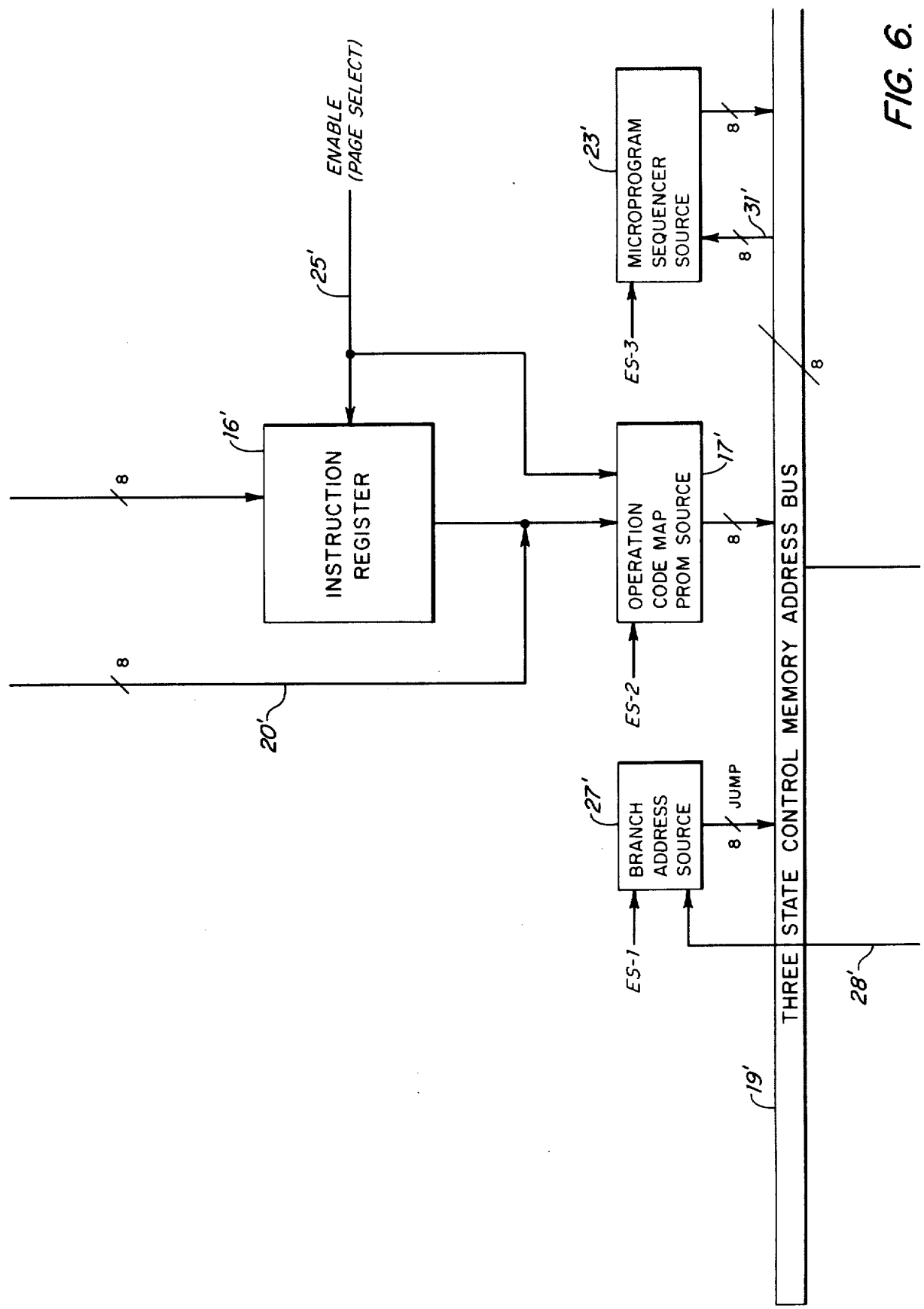
Figure 7:
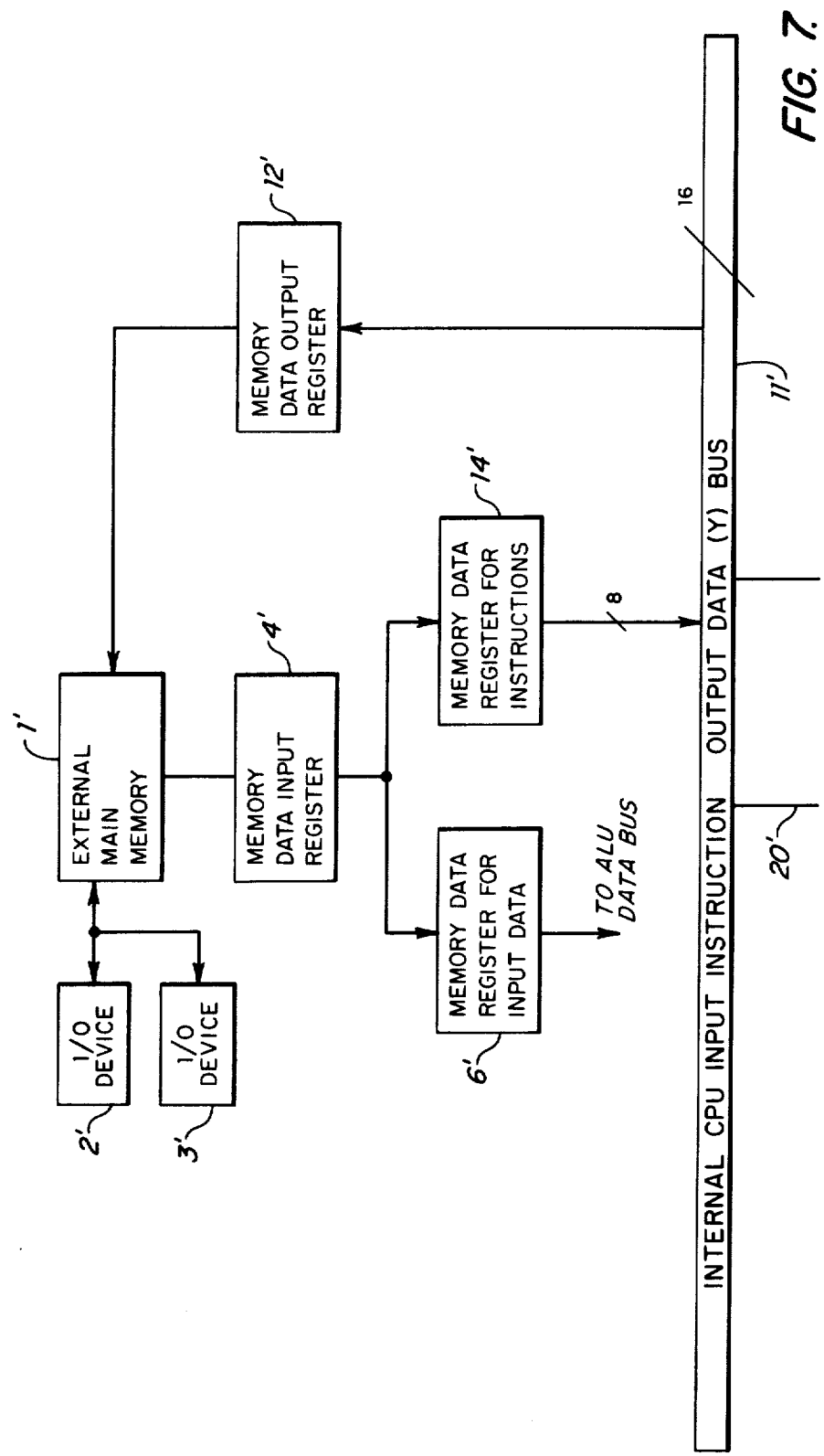

In order to carry out the above described objects of the invention, a second microprogrammed processor is provided in FIGS. 5, 6, and 7 which is basically the same as the above-described processor of FIGS. 2, 3 and 4, and thus those components in the second processor of FIGS. 5, 6 and 7 are designated with primed numbers corresponding to the components of the first processor. For example, branch address source 27', OCMM 17' and microprogram sequencer source 23' are coupled to a three-state control memory address bus 19' which in turn is coupled to microprogram control memory 18' of FIG. 5. In accordance with one embodiment of the invention, a bi-directional gate 37 is coupled between address bus 19 and 19' to set the stage for the above-described exchange of microprogram sequencing data between the two processors comprising the disclosed processor network of the present invention. The ES-1, ES-2, and ES-3, output leads of NASD 24', are coupled to sources 27', 17' and 23' of the second processor (FIGS. 4–6) respectively, while leads ES-4, ES-5 and ES-6 of NASD 24' are coupled to sources 27, 17, and 23 respectively of the first processor. In like manner leads ES-1, ES-2, ES-3 of NASD 24 are coupled to sources 27', 17' and 23' of the second processor shown in FIG. 6, and leads ES-4, ES-5, and ES-6, of NASD 24 are coupled to sources 27, 17, and 23 of the first processor shown in FIG. 3. In accordance with the disclosed embodiment of the present invention, and depending upon the nature of the NASD input data, each NASD of each processor is capable of enabling selectively one of the six sources of both processors. However, only one NASD at a time is capable of so enabling one of the six sources of both processors. Bi-directional gate 37 at times links the control memory address busses 19 and 19' together during operations wherein the NASD of one processor enables a source of the other processor. If the output lead 37' of pipeline register 24 is activated, NASD 24 of the right-hand processor is enabled. At this time, enabling lead 70 of gated amplifier 38 is marked by an output lead from pipeline register 24, which ensures that a no-mark disable is applied to NASD 24' of the left-hand processor via lead 41. This is effected due to the inverting action of enabled inverter gated amplifier 38. On the other hand if an enable signal is not produced upon enable lead 37' and the processors are linked by bi-directional gate 37, the disable signal is inverted by inverter gate 38 to enable NASD 24' of the left-hand processor so that when the network is under the control of the right-hand processor, only one NASD at a time may be enabled. When the left-hand processor is controlling the network, an enable mark upon enable lead 41 will be inverted by inverter amplifier 42 to ensure that the NASD 24 of the right-hand processor is disabled. A disable signal upon 41 will enable NASD 24 due to the bit reversal inverter action. When the left-hand processor is controlling the network, inverted amplifier 38 is disabled and inverter amplifier 42 is enabled under the control of enabling leads at the output of pipeline register 24. Bi-directional address bus gate 37 is enabled during the linking of the two processors to transmit information in one direction or the other, depending upon whether lead 80 or 85 is marked by the pipeline register. As described earlier an object of the invention is to transfer real time control information at the micro level between processors to establish control from the processor that is processing the data determining the control sequence, and as a result, dynamic master/slave relationships are carried out to permit high performance by eliminating the need to transfer data information used to influence the microprogram sequencing process. Thus, at certain times the sources of the left-hand processor will be controlling the microprogram control memory of the right-hand processor whereas at other times the sources of the right-hand processor will be controlling the microprogram control memory of the left-hand processor, to enable for the first time, the establishment of dynamic master/slave relationships at the micro-processing level, to yield the beneficial advantages of a more powerful computer network described in early portions of the specification. It may be noted in passing that relatively simple instructions involve a number of address modes such as instructions to add the contents of one register to the contents of a second register. These instructions are transmitted directly to the OCMM 17 via bus 20 for a first level decoding operation. On the other hand, a second level decoding operation such as an "add immediate" instruction requires the use of instruction register 16. This is because this operation is more complex and requires retrieving an operand from the main memory immediately following the instruction, which data retrieved from the main memory would be added to an operand in a general register. OCMM 17 and microprogram control memory 18 also have a left and right hand "page" each of 256 words which is selected by the page select enable lead 25 coupled to the output circuit of pipeline register 24. Page bit lead 30 and page select lead 25 function to enable corresponding pages (left or right) of OCMM 17 and microprogram control memory 18. Since first and second level decoding, and the page select functions, do not directly bear upon the present invention, further details are omitted. Another configuration which may be employed in practising the present invention is one which may employ NASDs having three enabling output leads ("ES" leads) rather than six. For example, NASD 24' could control sources 27', 17' and 23' and not control the sources of the right-hand processor. On the other hand, NASD 24 could only control sources 27, 17 and 23 and not control sources 27', 17' and 23'. The inverters of NASD control gate 39 would function as described above so that only one NASD of one processor would be enabled during a given period. With this more restricted embodiment, the right-hand processor could supply control data from its own sources 27, 17 and 23 to its own control memory 18 and to control memory 18' of the left-hand processor. However, the right-hand processor could not control its own control memory 18 from the sources 27', 17' and 23' of the left-hand processor. It is also believed feasible to employ a single NASD having six enable leads for controlling the six sources of both processors. During the linking of the processors gates 37, 39, and 44 are generally enabled to carry out the transfer of microprogram control data, and arithmetic data between ALUs.

At other times in order to match processor resources to the data processing load for example, the processors will be un-linked by disabling bi-directional gate 37 which uncouples the control memory address busses 19 and 19'. At the same time, inverters 38 and 42 could be disabled so that each NASD may be simultaneously enabled to control the sources of its own associated processor. In this unlinked mode, the bi-directional amplifiers of unit 44 will generally decouple the arithmetic sections of the processors.

Three or more processors may be coupled to the three-state control memory address bus 19 by means of additional gates to expand the processor network. Generally only one NASD of one processor will be enabled at a time by a selector switch having N output terminals, one for each NASD. The operation of such selector could be under the control of a specified microprogram control memory. For example, if each processor is designed to solve 16-bit problems and the processor network receives instructions to solve a 64-bit problem, four processors could be linked together until such 64-bit problem is solved.

Figure 8:
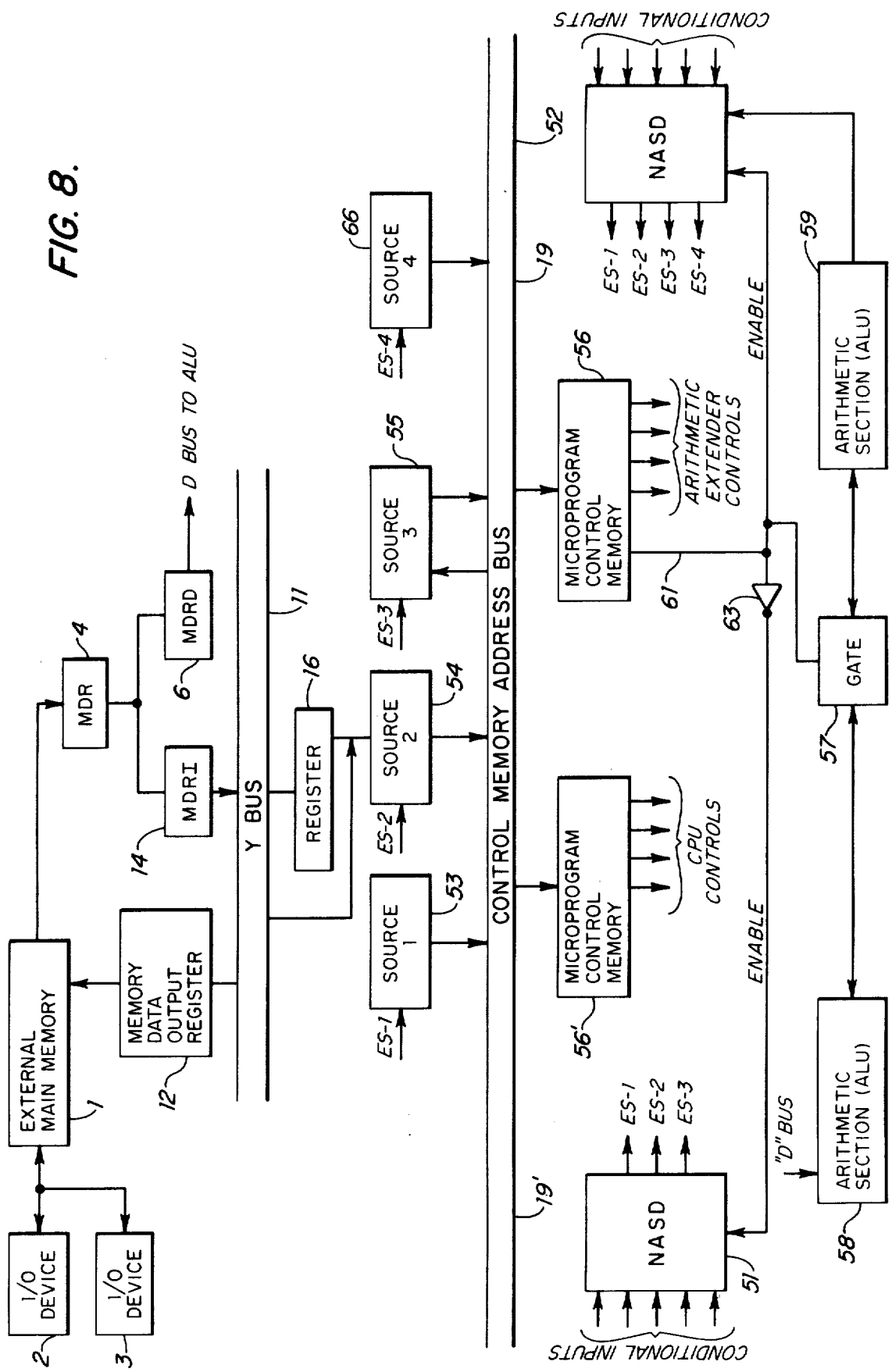

As discussed earlier, the control memory address busses of each processor may be permanently linked and the control sources of the left-hand processor may control the microprogram control memories of both processors to produce a single processor of multiple precision by utilizing the extended word length of a string of processors to achieve increased performance for higher precision computations. FIG. 8 discloses such an embodiment developed by the assignee of the present invention. A left-hand CPU is provided having components numbered in accordance with the previously described CPU components. The three-state control memory address busses 19 and 19' may, if desired, be permanently linked together as shown in FIG. 8. The right-hand processor in this embodiment is not a CPU since it does not decode instructions or receive main memory data. Furthermore, it does not employ microprogram control data generated by its own sources corresponding to 27, 17 and 23 previously described.

Let it be assumed that the left-hand CPU of FIG. 8 is solving a 16-bit problem. Under these conditions, NASD 51 is enabled and NASD 52 is disabled so that the left-hand CPU controls its own microprogram control memory address sources 53, 54 and 55. Since microprogram control memory 56 is coupled to the linked control memory address bus it is generating data which may be designated as "nonsense" data because gate 57 linking ALUs 58 and 59 is disabled along with NASD 52. Now let it be assumed that the address data applied to microprogram control memory 56 indicates that a 32-bit computation is to be carried out. Under these circumstances an enabling signal may be produced on output lead 61 of control memory 56 which would enable NASD 52 and disable NASD 51 due to the action of inverter 63. Control memory 56, as well as 56', is now effective in producing computations within ALU 59 which are effective in solving the 32-bit problem owing to the enabling of gate 57 linking the ALUs of each processor together. Data produced by the sources of the left-hand processor will, upon the completion of the 32-bit problem, cause a disable signal to be produced on lead 61 which decouples the ALUs owing to the disabling of gate 57. The action of inverter 63 will now again enable NASD 51 and the right-hand arithmetic extension processor is no longer operational. In this embodiment, the right-hand processor may be characterized as a slave multi-processor arithmetic extender (MAX).

As before, microprogram control can be supplied from the processor that is processing the data determining the control sequence. For example, when performing floating point instructions, when control information or decisions based on mantissa operations or sign conditions is required, the left-hand CPU becomes the source and transfers next address information over the control bus to the MAX. If an operation involving a decision based on exponent calculations) becomes the source (source 66) and transfers control information to the left-hand CPU. Generally speaking however, it should be understood that the use of any source in conjunction with the MAX processor is optional.

All lines described hereinabove except the pipeline register outputs preferably comprise three-state busses. The data transmitted over "D" bus 7 is primarily arithmetic data or effective address index pointers and the term "arithmetic" is intended to include virtually any variable data to be processed, e.g. alpha-numeric, alphabetical, vector designations, etc. The term "bus" is to be construed in its broadest sense and includes any means for transmitting data.

While preferred embodiments of the invention have been described, the teachings of this invention will readily suggest many other embodiments of those skilled in the art and thus the invention is to be limited only by the permissible scope of the following claims.

What is claimed is:

1. A processor network comprising at least first and second microprogrammed digital processors,
   1. each of said processors including:
      a. microprogram control means;
      b. control memory address bus for carrying microprogram sequencing information;
      c. an operation code mapping memory for generating an address code for addressing said microprogram control means via said control memory address bus;
      d. an arithmetic logic unit for receiving input data to be processed;
      e. data transfer means coupled between the output circuit of said microprogram control means and an input control circuit of said arithmetic logic unit;
      f. microprogram sequencer source means for sequencing said microprogram control means via the address bus;
      g. next control memory address source designator coupled to said arithmetic logic unit for selectively coupling said microprogram sequencer source means or said operation code mapping memory of one or the other(s) of said processors to said address bus depending upon the nature of the data generated by said arithmetic logic unit and/or other conditional input data transmitted to said memory address source designator;
   2. means for coupling said microprogram address busses of said processors together at least part of the time for exchanging microprogram sequencing information between processors; and
   3. means coupled between the arithmetic logic unit sections of said processors to provide for the selective flow of data between the arithmetic logic unit sections of said processors.

2. The combination as set forth in claim 1 wherein said control memory address bus is a three-state bus for preventing more than one of said source means from being effectively coupled to said microprogram control means.

3. The combination as set forth in claim 1 wherein said coupling means of paragraph 2 comprises a first bi-directional gate means for selectively permitting the flow of microprogram sequencing information in one direction or the other between said processors.

4. The combination as set forth in claim 1 further including a second bi-directional gate means coupled between the arithmetic logic unit sections of said processors to provide for the selective flow of data between the arithmetic logic unit sections of said processors.

5. The combination as set forth in claim 11 wherein said control memory address bus is a three-state bus for preventing more than one of said source means from being effectively coupled to said microprogram control means.

6. The combination as set forth in claim 3 further including second bi-directional gate means coupled between the arithmetic logic unit sections of said processors to provide for the selective flow of data between the arithmetic logic unit sections of said processors.

7. The combination as set forth in claim 3 further including second bi-directional gate means coupled between the arithmetic logic unit sections of said processors to provide for the selective flow of data between the arithmetic logic unit sections.

8. The combination as set forth in claim 5 further including second bi-directional gate means coupled between the arithmetic logic unit sections of said processors to provide for the selective flow of data between such arithmetic logic unit sections.

9. A processor network comprising at least first and second microprogrammed digital processors,
   1. each of said processors including:
      a. microprogram control means;
      b. control memory address bus for carrying microprogram sequencing information;
      c. an operation code mapping memory for generating an address code for addressing said microprogram control means via said control memory address bus;
      d. an arithmetic logic unit for receiving input data to be processed;
      e. pipeline register coupled between the output circuit of said microprogram control means and an input circuit of said arithmetic logic unit;
      f. microprogram sequencer source means for sequencing said microprogram control means via said address bus;
      g. branch address source means for supplying jump instructions to said microprogram control means via said address bus;
      h. next control memory address source designator coupled to said arithmetic logic unit for selectively coupling said microprogram sequencer source means or said branch address source means or said operation code source means of one or the other(s) of said processors to said address bus depending upon the nature of the data generated by said arithmetic logic unit and/or other conditional input data transmitted to said memory address source designator;
   2. means for coupling said microprogram address busses of said processors together at least part of the time for exchanging microprogram sequencing information between processors; and
   3. means coupled between the arithmetic logic unit sections of said processors to provide for the selective flow of data between the arithmetic logic unit sections of said processors.

10. The combination as set forth in claim 9 wherein said control memory address bus is a three-state bus for preventing more than one of said source means from being effectively coupled to said microprogram control means.

11. The combination as set forth in claim 9 wherein said coupling means of paragraph 2 comprises a first bi-directional gate means for selectively permitting the flow of microprogram sequencing information in one direction or the other between said processors.

12. The combination as set forth in claim 9 further including second bi-directional gate means coupled between the arithmetic logic unit sections of said processors to provide for the selective flow of data between the arithmetic logic unit sections of said processors.

13. The combination as set forth in claim 10 further including second bi-directional gate means coupled between the arithmetic logic unit sections of said processors to provide for the selective flow of data between the arithmetic logic unit sections of said processors.

14. The combination as set forth in claim 11 wherein said control memory address bus is a three-state bus for preventing more than one of said source means from being effectively coupled to said microprogram control means.

15. The combination as set forth in claim 11 further including second bi-directional gate means coupled between the arithmetic logic unit sections of said processors to provide for the selective flow of data between the arithmetic logic unit sections.

16. The combination as set forth in claim 14 further including second bi-directional gate means coupled between the arithmetic logic unit sections of said processors to provide for the selective flow of data between such arithmetic logic unit sections.

17. A processor network comprising at least first and second microprogrammed digital processors,
   1. said first processor including:
      a. microprogram control means;
      b. control memory address bus for carrying microprogram sequencing information;
      c. operation code source means for providing address codes for addressing said microprogram control means via said control memory address bus;
      d. an arithmetic logic unit for receiving input data to be processed;
      e. data transfer means coupled between the output circuit of said microprogram control means and in input control circuit of said arithmetic logic unit;
      f. a microprogram sequencer source means for sequencing said microprogram control means via said address bus;
      g. next control memory address source designator coupled to said arithmetic logic unit for selectively coupling said microprogram sequencer source means or said operation code source means of said first processor to said address bus depending upon the nature of the data generated by said arithmetic logic unit and/or other conditional input data transmitted to said memory address source designator;
   2. said second processor including:
      a. microprogram control means;
      b. control memory address bus for carrying microprogram sequencing information;

c. an arithmetic logic unit for receiving input data to be processed;
d. data transfer means coupled between the output circuit of said microprogram control means and in input control circuit of said arithmetic logic unit;
e. next control memory address source designator coupled to said arithmetic logic unit for selectively coupling said microprogram source means or said operation code source means of said first processor to said address bus depending upon the nature of the data generated by said arithmetic logic unit and/or other conditional input data transmitted to said memory address source designator; and 3. means for coupling said microprogram address busses of said processors together at least part of the time for exchanging microprogram sequencing information between processors; and
4. means coupled between the arithmetic logic unit sections of said processors to provide for the selective flow of data between the arithmetic logic unit sections of said processors.

18. The combination as set forth in claim 17 wherein said control memory address bus of said first processor is a three-state bus for preventing more than one of said source means from being effectively coupled to said microprogram control means.

19. The combination as set forth in claim 17 wherein said coupling means of paragraph 3 permanently couples said microprogram address busses together.

20. The combination as set forth in claim 17 further including bi-directional gate means coupled between the arithmetic logic unit sections of said processors to provide for the selective flow of data between the arithmetic logic unit sections of said processors.

21. The combination as set forth in claim 19 wherein said control memory address bus of said first processor is a three-state bus for preventing more than one of said source means from being effectively coupled to said microprogram control means.

22. The combination as set forth in claim 18 further including bi-directional gate means coupled between the arithmetic logic unit sections of said processors to provide for the selective flow of data between the arithmetic logic unit sections of said processors.

23. The combination as set forth in claim 19 further including second bi-directional gate means coupled between the arithmetic logic unit sections of said processors to provide for the selective flow of data between the arithmetic logic unit sections.

24. The combination as set forth in claim 21 further including second bi-directional gate means coupled between the arithmetic logic unit sections of said processors to provide for the selective flow of data between such arithmetic logic unit sections.

* * * * *